United States Patent [19]
Snowden et al.

[11] Patent Number: 6,083,317
[45] Date of Patent: *Jul. 4, 2000

[54] STABILIZED CALCIUM CARBONATE COMPOSITION USING SODIUM SILICATE AND ONE OR MORE WEAK ACIDS OR ALUM AND USES THEREFOR

[75] Inventors: Kevin J. Snowden, Milledgeville, Ga.; Kuan-Ting Wu, Yunlin, Taiwan; Jose M. Rodriguez, Eatonton, Ga.

[73] Assignee: Imerys Pigments, Inc., Roswell, Ga.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/743,872

[22] Filed: Nov. 5, 1996

[51] Int. Cl.[7] ........................................ C09C 1/02
[52] U.S. Cl. .................. 106/464; 106/465; 106/466; 106/627; 162/181.1; 162/181.3; 162/181.6; 162/181.7
[58] Field of Search ..................... 106/464, 465, 106/471, 466, 627; 162/181.1, 181.6, 181.7, 158, 181.3

[56] References Cited

U.S. PATENT DOCUMENTS

| | | | |
|---|---|---|---|
| 4,242,318 | 12/1980 | Brahm et al. | 106/464 |
| 4,781,982 | 11/1988 | Musselman et al. | 106/465 |
| 5,000,791 | 3/1991 | Tokarz et al. | 106/465 |
| 5,043,017 | 8/1991 | Passaretti | 106/465 |
| 5,164,006 | 11/1992 | Chapnerkar et al. | 106/465 |
| 5,531,821 | 7/1996 | Wu | 106/464 |
| 5,584,923 | 12/1996 | Wu | 106/464 |
| 5,593,488 | 1/1997 | Wu | 106/464 |
| 5,593,489 | 1/1997 | Wu | 106/464 |
| 5,599,388 | 2/1997 | Wu | 106/464 |
| 5,711,799 | 1/1998 | Snowden et al. | 106/465 |

*Primary Examiner*—Michael Marcheschi
*Attorney, Agent, or Firm*—Finnegan, Henderson, Farabow, Garrett & Dunner, L.L.P.

[57] ABSTRACT

An improved form of calcium carbonate which is acid resistant to enable its use as a filler material in the making of neutral to weakly acidic paper, and a process for producing this acid-resistant calcium carbonate is provided. This acid-resistant calcium carbonate composition comprises calcium carbonate and at least about 0.1% to about 25% based on the dry weight of the calcium carbonate, of sodium silicate, together with at least 0.1% to about 25 percent, based on the dry weight of the calcium carbonate, of a weak acid, such as phosphoric acid, formic acid, fluoroboric acid, polyacrylic acid, or alum, or a mixture of weak acids, such as phosphoric acid and polyacrylic acid.

6 Claims, 10 Drawing Sheets

STABILIZED CALCIUM CARBONATE COMPOSITION USING SODIUM SILICATE AND ONE OR MORE WEAK ACIDS OR ALUM AND USES THEREFOR

BACKGROUND OF THE INVENTION

This invention relates generally to calcium carbonate for use in papermaking, and related industries, and more particularly to a calcium carbonate having acid resistant properties.

Titanium dioxide and calcined clay have traditionally been utilized as filler materials in the preparation of alkaline to weakly acidic paper in order to improve the optical properties, especially the brightness, of the resultant product. These materials, however, especially titanium dioxide, have the disadvantage of being very expensive, resulting in higher manufacturing costs and an uncompetitively priced paper product.

Calcium carbonate, particularly precipitated calcium carbonate, has been used as a filler material in the making of alkaline paper. Such usage results in a paper with enhanced optical properties, without the expense incurred in using titanium dioxide fillers, resulting in a much less expensive product. Calcium carbonate, however, cannot generally be used as a filler in acidic paper because it has low acid-resistance, causing it to decompose in an acidic environment. Consequently, there has long been a need to develop a calcium carbonate composition which is acid stabilized and resistant to decomposition at low/neutral pH, so that it can be utilized as a filler material in the manufacture of acidic paper, such as groundwood paper, where the use of an alkaline filler would have a negative impact on the final paper properties, and where the pH of the process waters tends to increase, thereby increasing its foaming action.

Paper made from mechanical pulps has been traditionally produced under acidic papermaking conditions because of "fiber alkaline darkening" that occurs as pH rises. This means that there is a reduction in brightness of the paper (brightness reversion) when the pH is raised from acid to alkaline in wood-containing systems. Alkaline darkening will occur to some degree in any wood pulps with significant lignin content. The degree of darkening generally depends factors, such as the particular pulps, the pH, and the water quality. In general, ground calcium carbonate and precipitated calcium carbonate fillers serve as a buffer in the 7.5–9.2 pH range when used in the wet end, which is that portion of the paper machine which includes the headbox, wire part, and first press section. Acid-resistant calcium carbonate compositions thus provide a means for reducing the degree of fiber alkaline darkening and brightness reversion due to their ability to maintain a stabilized pH.

A variety of techniques to modify calcium carbonate to achieve acid resistance and to avoid the aforementioned problems are disclosed in the art. For instance, U.S. Pat. No. 5,043,017 discloses and claims an acid-stable calcium carbonate resistant to degradation in a mildly acidic environment which comprises a mixture of a calcium-chelating agent or a conjugate base, and a weak acid, such that calcium carbonate is coated by, and is in equilibrium with, the calcium-chelating agent or conjugate base and the weak acid. Preferred calcium carbonate compositions contain sodium hexametaphosphate and phosphoric acid. A disadvantage of this technique is that some mills are regulated on the amount of phosphates that can be in their effluents, and therefore, can not afford to have extra phosphates being introduced into their system.

U.S. Pat. No. 5,000,791 discloses the preparation of an acid-resistant coating for calcium carbonate particles. This acid-resistant calcium carbonate is prepared by simultaneously mixing the calcium carbonate with a solution of a zinc compound and a solution of a silica-containing substance which is preferably sodium water glass. The zinc compound, preferably, is zinc chloride or zinc oxide. The addition of the zinc compound and the silica-containing substance is in combination with a strong acid. A disadvantage of this technique is that it uses zinc, which generally is an undesirable metal to have in the whitewaters, product, or effluents, since it does not meet EPA standards.

U.S. Pat. No. 5,164,006 discloses and claims an acid resistant calcium carbonate which is prepared by preparing an aqueous slurry of calcium carbonate, heating the slurry to about 75–80 degree Celsius, slowly adding sodium silicate solution in an about 5–10% by weight, adding gaseous carbon dioxide, cooling the slurry and adding zinc chloride to the slurry to bring the pH to a range of 7.5 to 8.0. This technique has the same disadvantage as the aforesaid U.S. Pat. No. 5,000,791 since zinc in the whitewaters, product, or effluents does not meet EPA standards.

Other techniques to surface treat or coat calcium carbonate to achieve higher acid-resistance are disclosed in U.S. Pat. Nos. 5,531,821; 5,593,488; 5,593,489; 5,599,388; and 5,647,902 and in U.S. patent application 08/546,145 owned by the same assignee as this present application.

SUMMARY OF THE INVENTION

The present invention relates to improved calcium carbonate compositions which are stabilized relative to acid environments and, which are therefore, acid resistant. These compositions are useful as a filler material in the making of neutral to weakly acid paper. The instant invention is also directed to a process for producing this acid resistant calcium carbonate.

More particularly, this invention is directed to an acid resistant calcium carbonate composition comprising: a) calcium carbonate; b) at least about 0.1 weight percent based on the dry weight of the calcium carbonate, of a suitable silicate; and c) at least about 0.1 weight percent, based on the dry weight of the calcium carbonate, of i) at least one weak acid, on an active basis; or ii) alum, on an active basis. It has surprisingly been found that the inclusion of a silicate and either at least one weak acid or alum confers a higher degree of stability and acid resistance for calcium carbonate in the presence of fiber slurry, and a longer term of pH stability, than known acid-stabilized calcium carbonate compositions.

It is an object of the present invention to provide a stabilized and acid resistant calcium carbonate composition especially suitable for use in acid papermaking applications.

It is a further object of the present invention to provide a process for the preparation of the aforesaid calcium carbonate compositions.

A still further object of the present invention is to provide an improved paper product having enhanced optical qualities prepared using the calcium carbonate compositions of the present invention.

A still further object of the present invention is to provide improved calcium carbonate compositions used as a filler in wood containing papermaking systems.

DETAILED DESCRIPTION OF THE INVENTION

The improved calcium carbonate compositions of the instant invention are stabilized relative to acidic environments. This acid resistance or tolerance enables their use as filler materials in the making of neutral to weakly acid paper, rubber, and plastics, but for purposes of illustration will be discussed herein with reference as a filler material in the making of neutral to weakly acid paper. While not wishing to be bound by any particular theory as to the operability of the present invention, it is believed that the acid resistance of the improved calcium carbonate compositions of the present invention is a result of the inactivation of the surface of the calcium carbonate by the addition of a silicate. i.e. sodium silicate, in combination with at least one weak acid, e.g. polymeric acid, phosphoric acid, formic acid, or fluoroboric acid, or alum.

The instant invention is directed to an acid resistant calcium carbonate composition, comprising:
 a) calcium carbonate;
 b) at least about 0.1%, based on the dry weight of said calcium carbonate, of a silicate, preferably sodium silicate; and
 c) at least about 0.1%, based on the dry weight of calcium carbonate, of:
  i) at least one weak acid, on an active basis, or
  ii) alum, on an active basis.

The instant invention is further directed to a method for preparing an acid resistant calcium carbonate composition, comprising:
 a) adding to a calcium carbonate composition at least about 0.1%, based on the dry weight of calcium carbonate in said composition, of a silicate, preferably sodium silicate;
 b) adding to said calcium carbonate composition, at least about 0.1%, based on the dry weight of the calcium carbonate, of:
  i) at least one weak acid, on an active basis, or
  ii) alum, on an active basis.

The instant invention is further directed to improved paper products containing an effective amount of the instant acid resistant calcium carbonate composition and to a method for preparing the same comprising adding to a papermaking stream an effective amount of an acid resistant calcium carbonate composition, comprising:
 a) calcium carbonate;
 b) at least about 0.1%, based on the dry weight of said calcium carbonate, of a silicate, preferably, sodium silicate; and
 c) at least about 0.1%, based on the dry weight of said calcium carbonate, of:
  i) at least one weak acid, on an active basis, or
  ii) alum, on an active basis.

As used herein, the term "calcium carbonate" refers to a ground calcium carbonate (GCC), which is a marble which has been crushed and ground to between 30 and 100% finer than 2 microns, or to a precipitated calcium carbonate (PCC), which is made by bubbling $CO_2$ through a lime slurry.

As used herein, the term "silicate" refers to any suitable silicate, which is water soluble, and broadly defined as a salt derived from silica or the silicic acids. Alkali silicates are preferred, with the most preferred silicate being sodium silicate.

As used herein, the term "weak acid" refers to acids that are not 100% ionized in in a given solvent, preferably, water.

As used herein, the term "effective amount" refers to that quantity of the instant acid resistant calcium carbonate composition necessary to provide sufficient acid resistance to the paper stream, slurry, or product being treated. Generally, at least about 0.1 ppm of such composition are added to the paper stream, slurry, or product being treated with preferred dosages ranging from about 0.1% to about 30% based on the fiber weight of the groundwood.

In the practice of the present invention, the calcium carbonate compositions are rendered acid resistant by the addition of at least about 0.1 percent, based on the dry weight of the calcium carbonate, of a suitable silicate together with at least about 0.1%, based on the dry weight of the calcium carbonate, of at least one weak acid or a mixture of two or more weak acids, on an active basis, or alum, on an active basis. Preferred weak acids are selected from the group consisting of organic acids containing one or more carboxyl radicals. More preferred are polymeric weak acids, such as polymeric acids prepared from ethylenetically unsaturated carboxylic monomers, such as acrylic acid, methacrylic acid, fumaric acid, and maleic acid. These polymers preferably have weight average molecular weights of less than about 1,000,000, and preferably less than 50,000, as determined by light scattering techniques. Other weak acids that are preferred are selected from the group consisting of phosphoric acid, metaphosphoric acid, hexametaphosphoric acid, ethylenediaminetetraacetic acid (EDTA), sulfurous acid, acetic acid, boric acid, gallic acid, glutanic acid, benzoic acid, oxybenzoic acid, salicyclic acid, stearic acid, citic acid, formic acid, or fluoroboric acid. More preferred from this group of weak acids is phosphoric acid. Mixtures of such acids can also be used. If only one weak acid is used, it is most preferably, selected from the group consisting of fluoroboric acid, formic acid, or polyacrylic acid. Alternately, alum, which is aluminum sulphate ($Al_2(SO_4)_3 \cdot 18H_2O$) can be used instead of the weak acid(s) in conjunction with the silicate for the surface treatment of the calcium carbonate. The preferred range for the sodium silicate and the weak acid or mixture of weak acids, or alum is from about 0.1% to about 25%, based on the dry weight of the calcium carbonate. Most preferably, the range for the sodium silicate is about 1.0% to about 5.0%.

While not wishing to be bound by any theory, it is believed that the capability of the acid-stabilized calcium carbonate of the present invention to resist dissociation in an acidic environment is due to the formation of ionic bonds between the calcium and the silicate. This mechanism of ionic bonding is distinct from the reaction of the prior art chelating agent or silica-containing substance on the surface of calcium carbonate. Ionic bonding can provide an insoluble calcium silicate surface which reduces the dissolution reaction of calcium carbonate; whereas, a chelating agent or silica-containing substance acts as a coordinating compound in which a single ligand occupies more than one coordinating position or precipitated silica on the surface.

As indicated above, the preferred silicate is sodium silicate. Sodium silicate utilized in the compositions of the present invention is commercially available in forms suitable for direct inclusion into the calcium carbonate mixture. The amount of the sodium silicate utilized is at least 0.1%, based on the dry weight of the calcium carbonate, and is preferably about 0.1% to about 25%, based on the dry weight of calcium carbonate.

Preferred combinations of sodium silicate and weak acids for use in the present invention include sodium silicate/polyacrylic acid/phosphoric acid. Preferred combinations of sodium silicate and a weak acid for use in the present invention include sodium silicate/phosphoric acid, sodium silicate/formic acid, and sodium silicate/fluorobic acid. A further preferred combination includes sodium silicate/alum.

The calcium carbonate utilized is preferably finely divided and it can be either a precipitated calcium carbonate or a natural ground limestone.

As an example exemplifying the best mode, the process for producing an acid resistant calcium carbonate involves first forming a mixture of calcium carbonate with at least about 0.1%, based on the dry weight of the calcium carbonate, of the sodium silicate. Then, at least about 0.1%, based on the dry weight of the calcium carbonate, of a weak polymeric acid, such as a polyacrylic acid having a molecular weight of less than about 50,000 is added to this resultant mixture. Finally, the resultant mixture is blended for a sufficiently long period of time to ensure uniform mixing of the ingredients.

The calcium carbonate can be utilized in the above-described process either as a dry powder or an aqueous slurry with up to about 70% by weight solids content.

The silicate can be utilized in the instant process either as a dry solid or as an aqueous solution. When the calcium carbonate is used in dry powder form, it is preferable to utilize an aqueous solution of the sodium silicate in order to facilitate homogeneous mixing. Where a slurry of the calcium carbonate is utilized, the solid form of the sodium silicate readily dissolves therein so that an aqueous solution is unnecessary.

The acids or alum can be utilized in the process of preparation in either a concentrated form or a diluted aqueous solution.

In further preferred embodiments of the instant process, sodium silicate is first added to a calcium carbonate slurry followed by addition of a weak acid, such as a polymeric or a phosphoric acid, and then finally, the second acid, if two weak acids are utilized. If fluoroboric acid, or formic acid, or alum, or only one weak acid is utilized, then preferably, the sodium silicate is first added to the calcium carbonate slurry followed by either the fluoroboric acid, formic acid, alum, or weak acid. These components can be added by conventional means well-known in the art.

The compositions of the present invention can be utilized to improve the optical properties of neutral to weakly acidic paper by the addition of an effective amount of such a composition to the paper during standard manufacturing processes. Typically, the calcium carbonate composition of the present invention is added to a first paper furnish containing components necessary for making acidic paper to thereby form a second paper furnish.

The invention will be further illustrated by the following Examples, which are to be considered illustrative of the invention, and not limited to the precise embodiments shown. Examples 1 through 6 below involve the preparation of acid stabilized calcium carbonate slurries that are stable at pH's lower than 7.5.

EXAMPLE 1

Scalenohedral Precipitated Calcium Carbonate

Figure 1:
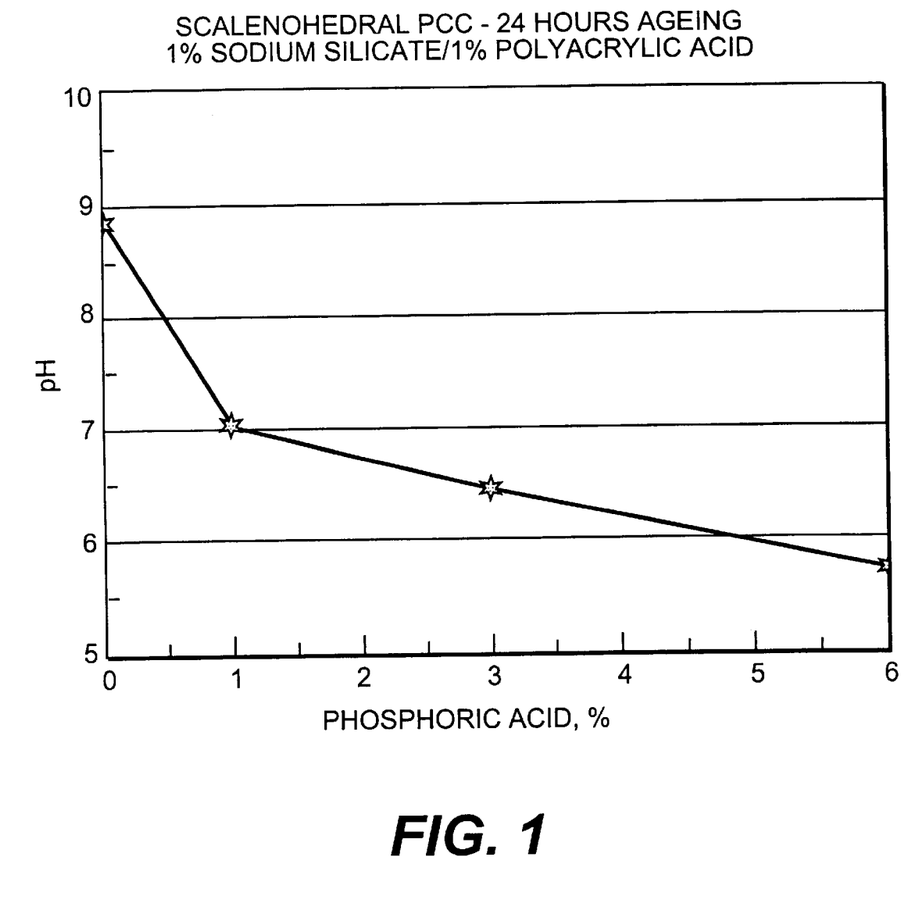
FIG. 1 shows a plot of pH for a scalenohedral precipitated calcium carbonate composition containing 1% sodium silicate and 1% polyacrylic acid versus various phosphoric acid concentrations after 24 hours of ageing.

Acid stabilized scalenohedral precipitated calcium carbonate slurry can be obtained by the addition of sodium silicate, followed by the addition of a weak acid such as phosphoric acid and a polymeric acid such as polyacrylic acid. Initially, 1% sodium silicate, based on the dry weight of calcium carbonate, was added into 18.5% solids slurry of scalenohedral precipitated calcium carbonate and mixed for about a minute. After mixing, this original slurry was transferred into several aliquots and 1% polyacrylic acid and amounts varying from 1 to 6% of phosphoric acid, based on the dry weight of calcium carbonate, were added to the aliquots. A plot of the pH was measured for each sample after 24 hours ageing as shown in FIG. 1. A composition containing 1% sodium silicate, based on the dry weight of calcium carbonate, and 6% phosphoric acid and 1% of polyacrylic acid, based on the dry weight of calcium carbonate was found to have an initial pH 5.28, and a pH of 5.75 after 24 hours ageing.

EXAMPLE 2

Scalenohedral Precipitated Calcium Carbonate

Figure 2:
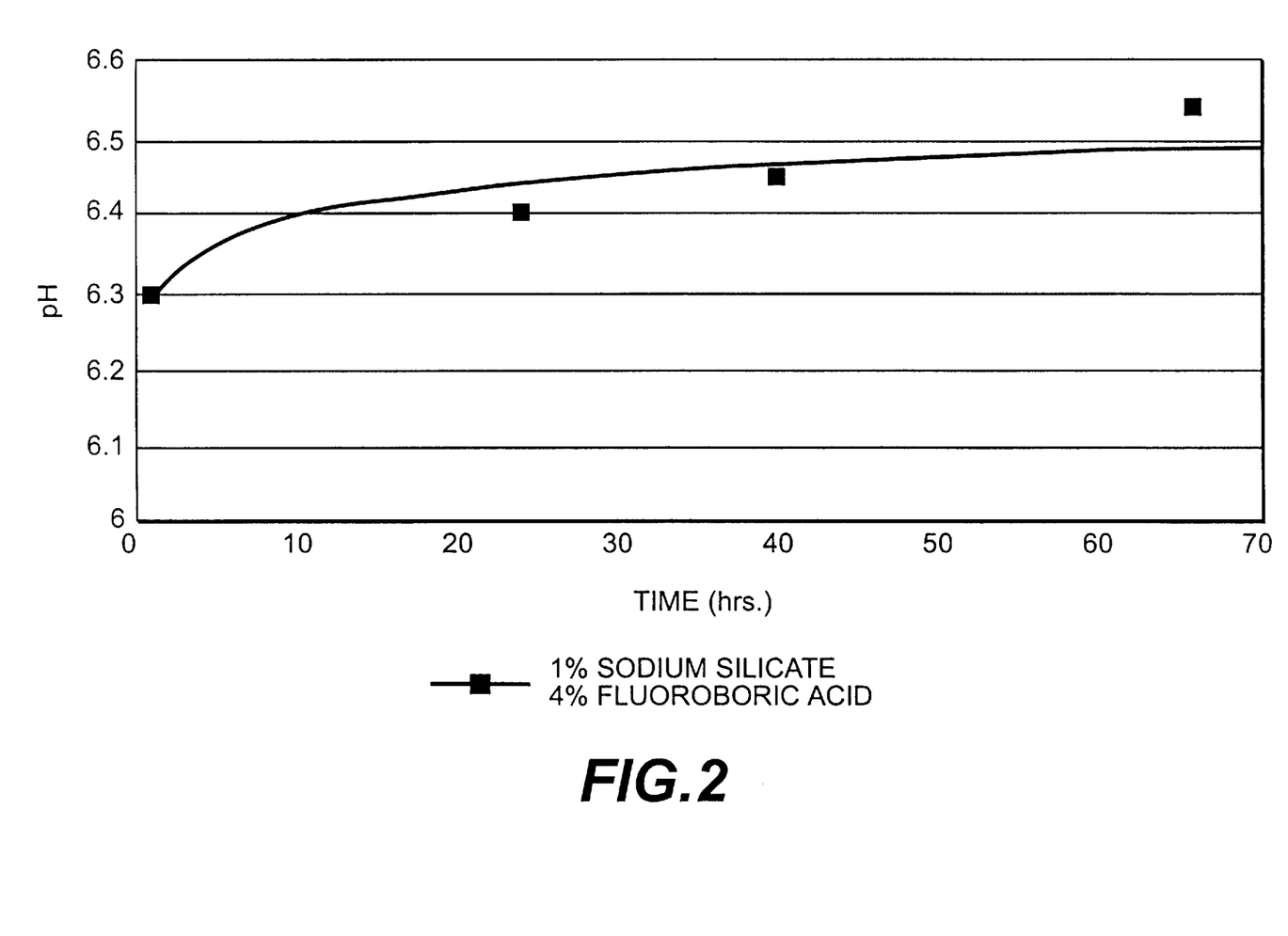
FIG. 2 shows a plot of pH for a scalenohedral precipitated calcium carbonate composition containing 1% sodium silicate and 4% fluoroboric acid versus time.

Acid stabilized scalenohedral precipitated calcium carbonate slurry can be obtained by addition of sodium silicate, followed by the addition of a weak acid, such as fluoroboric acid (HBF$_4$). Initially, 1% sodium silicate, based on the dry weight of calcium carbonate, was added into 18.5% solids slurry of scalenohedral precipitated calcium carbonate, and mixed for about 1 minute. The initial pH of this untreated calcium carbonate was 8.57. After mixing, 4% of fluoroboric acid was added to the slurry. A plot of the pH was measured after 66 hours ageing as shown in FIG. 2. A composition containing 1% sodium silicate, based on the dry weight of calcium carbonate, and 4% fluoroboric acid, based on the dry weight of calcium carbonate, was found to have an initial pH of 6.11, and a pH of 6.54 after 66 hours ageing, as shown in FIG. 2.

EXAMPLE 3

Scalenohedral Precipitated Calcium Carbonate

Figure 3:
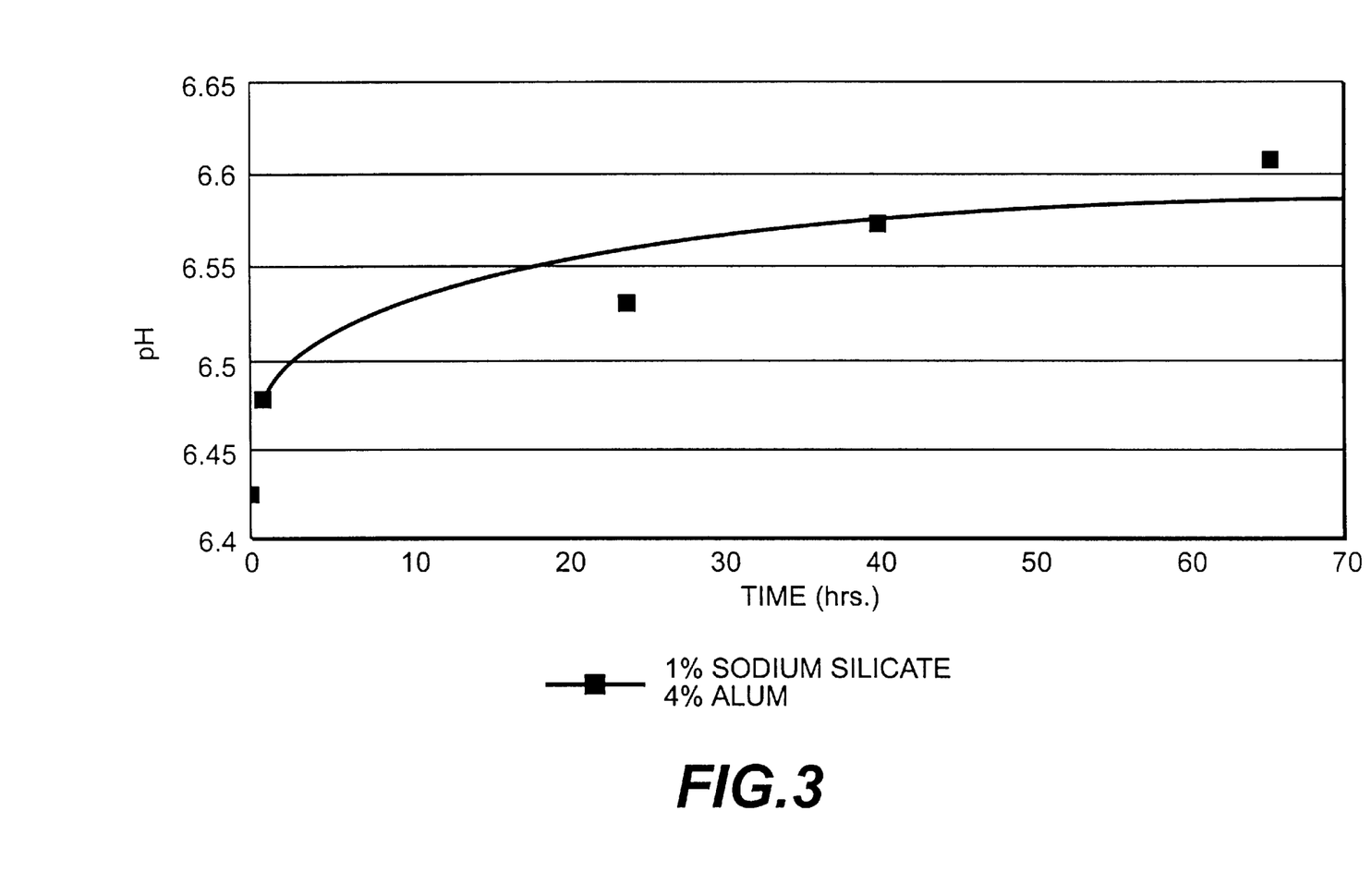
FIG. 3 shows a plot of pH for a scalenohedral precipitated calcium carbonate composition containing 1% sodium silicate and 4% alum versus time.

Acid stabilized scalenohedral precipitated calcium carbonate slurry can be obtained by the addition of sodium silicate, followed by the addition of alum, such as aluminum sulphate (Al$_2$(SO$_4$)$_3$·18 H$_2$O). 1% sodium silicate, based on the dry weight of calcium carbonate, was added into 18.5% solids slurry of scalenohedral precipitated calcium carbonate, and mixed for one minute. The pH of this untreated scalenohedral precipitated calcium carbonate was 8.57. To this mixture, 4% alum was added. Another mixture was mixed for another minute. The initial pH of this mixture treated with 1% sodium silicate/4% aluminum sulphate was 6.42. The pH of this treated mixture after 65 hours ageing was 6.61. A plot of the pH is shown in FIG. 3.

EXAMPLE 4

Rhombic Precipitated Calcium Carbonate

Figure 4:
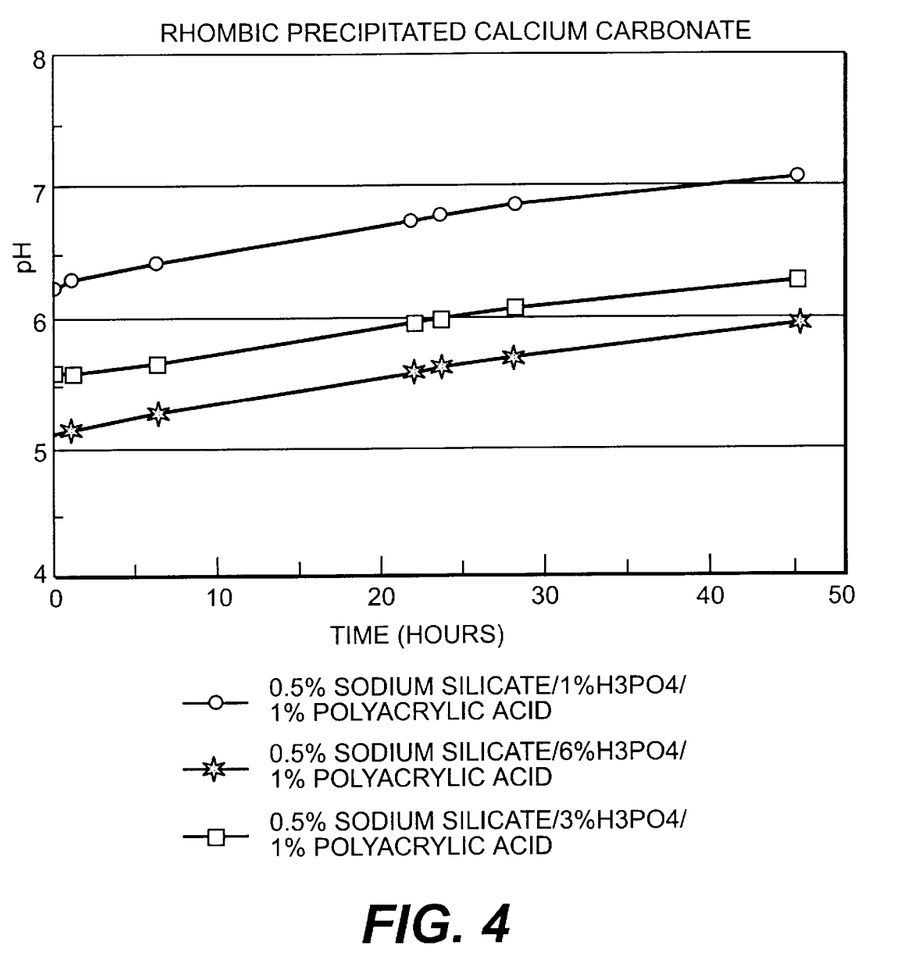
FIG. 4 shows a plot of pH for rhombic precipitated calcium carbonate composition containing 0.5% sodium silicate with either 1%, 3%, or 6% phosphoric acid, and 1% polyacrylic acid versus time.

Acid stabilized rhombic precipitated calcium carbonate slurry can be obtained by the addition of sodium silicate, followed by the addition of a weak acid such as phosphoric acid and a polymeric acid such as polyacrylic acid. First, 0.5% sodium silicate, based on the dry weight of calcium carbonate, was added into 18.2% solids slurry of rhombic precipitated calcium carbonate, and blended. From this slurry, several aliquots were prepared by adding 1% polyacrylic acid and 1%–6% phosphoric acid, based on the dry weight of calcium carbonate. The pH measurement was monitored for 24 hours ageing and 47 hours ageing. These results are shown in FIG. 4. One of the examples showed that the initial pH of rhombic precipitated calcium carbonate slurry treated with 0.5% sodium silicate/6% phosphoric acid/1% polyacrylic acid was 5.16; after 24 hours ageing, the pH was found to be about 5.5; and after 47 hours, the pH was found to be 5.98.

EXAMPLE 5

Rhombic Precipitated Calcium Carbonate

Figure 5:
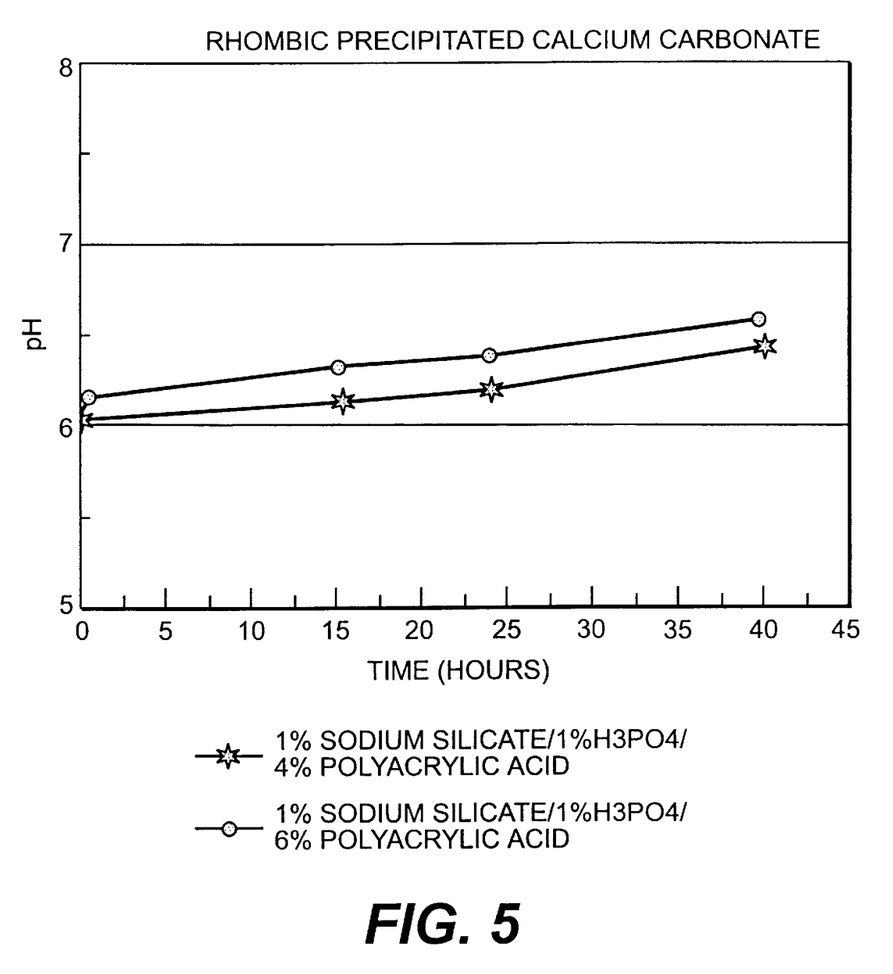
FIG. 5 shows a plot comparing the pH for a rhombic precipitated calcium carbonate composition containing 1% sodium silicate, 4% polyacrylic acid and 1% phosphoric acid, to the pH of a composition containing 1% sodium silicate, 1% phosphoric acid and 6% polyacrylic acid.

Acid stabilized precipitated calcium carbonate slurry can be obtained by the addition of sodium silicate, followed by the addition of phosphoric acid and polyacrylic acid. First, 1% sodium silicate, based on the dry weight of calcium carbonate, was added to 18.2% solids slurry of rhombic precipitated calcium carbonate and mixed for one minute. The pH of the slurry was 8.79. The slurry was separated into the aliquots. To one of these aliquots, 1% phosphoric acid and 4% polyacrylic acid was added. To the second sample, 1% phosphoric acid and 6% polyacrylic acid was added. The pH's were taken after 40 hours ageing, and the results are shown in FIG. 5. One of the examples showed that the initial pH of the rhombic precipitated calcium carbonate slurry treated with 1% sodium silicate/1% phosphoric acid/4% polyacrylic acid was 6.03; another pH of the slurry was found to be 6.44 after 40 hours ageing as shown in FIG. 5.

EXAMPLE 6

Ground Calcium Carbonate

The initial pH of a ground calcium carbonate was 8.01. Two 20% solid slurries of ground calcium carbonate were prepared; one slurry containing 3% sodium-silicate based on the dry weight of calcium carbonate, and a second slurry containing 5% sodium silicate based on the dry weight of calcium carbonate. Blended to each of these slurry mixtures were 6% phosphoric acid and 1% polyacrylic acid. The pH of these two slurries was checked periodically with the results appearing in FIG. 6. The initial pH of the slurry containing 3% sodium silicate/6% phosphoric acid/1% polyacrylic acid was measured and found to be 5.08, and after 48 hours ageing was found to be 6.59, as shown graphically in FIG. 6. In comparison, the initial pH of the slurry with 5% sodium silicate/6% phosphoric acid/1% polyacrylic acid was measured and found to be about 5.5, and after 48 hours ageing was measured and found to be about 6.8.

Figure 6:
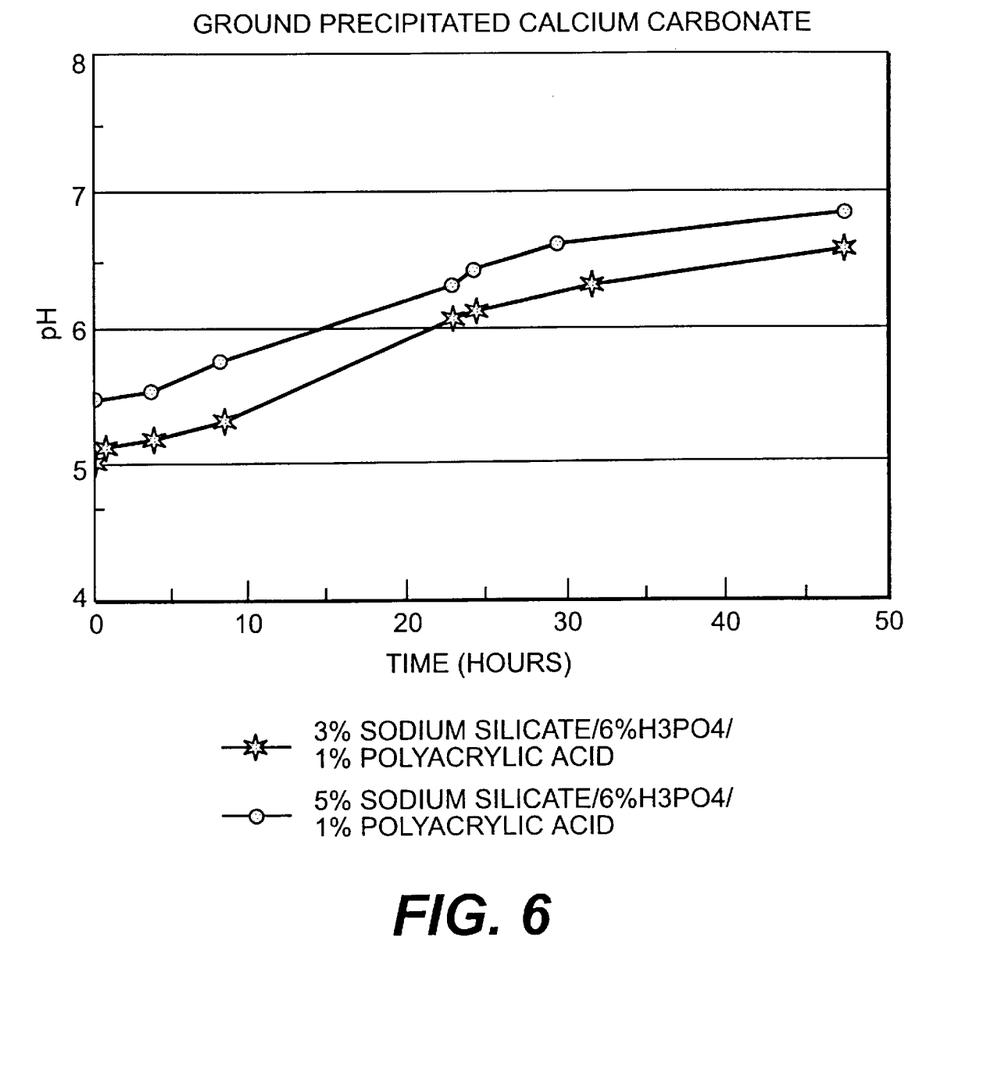
FIG. 6 shows a plot comparing the pH for a ground calcium carbonate composition containing 3% sodium silicate, 6% phosphoric acid, and 1% polyacrylic acid, to the pH of a composition containing 5% sodium silicate, 6% phosphoric acid, and 1% polyacrylic acid.

The final pH difference of the slurry containing the 5% sodium silicate was thus 1.72 units greater compared to the slurry containing the 3% sodium silicate after 48 hours ageing.

The above six examples show that acid resistance slurries of treated precipitated and ground calcium carbonate can be made by using sodium silicate in conjunction with a weak acid, such as phosphoric acid, polyacrylic acid, formic acid, fluoroboric acid, or with alum, and that these treated slurries survive after several hours below the 7.5 composition pH of calcium carbonate.

Figure 7:
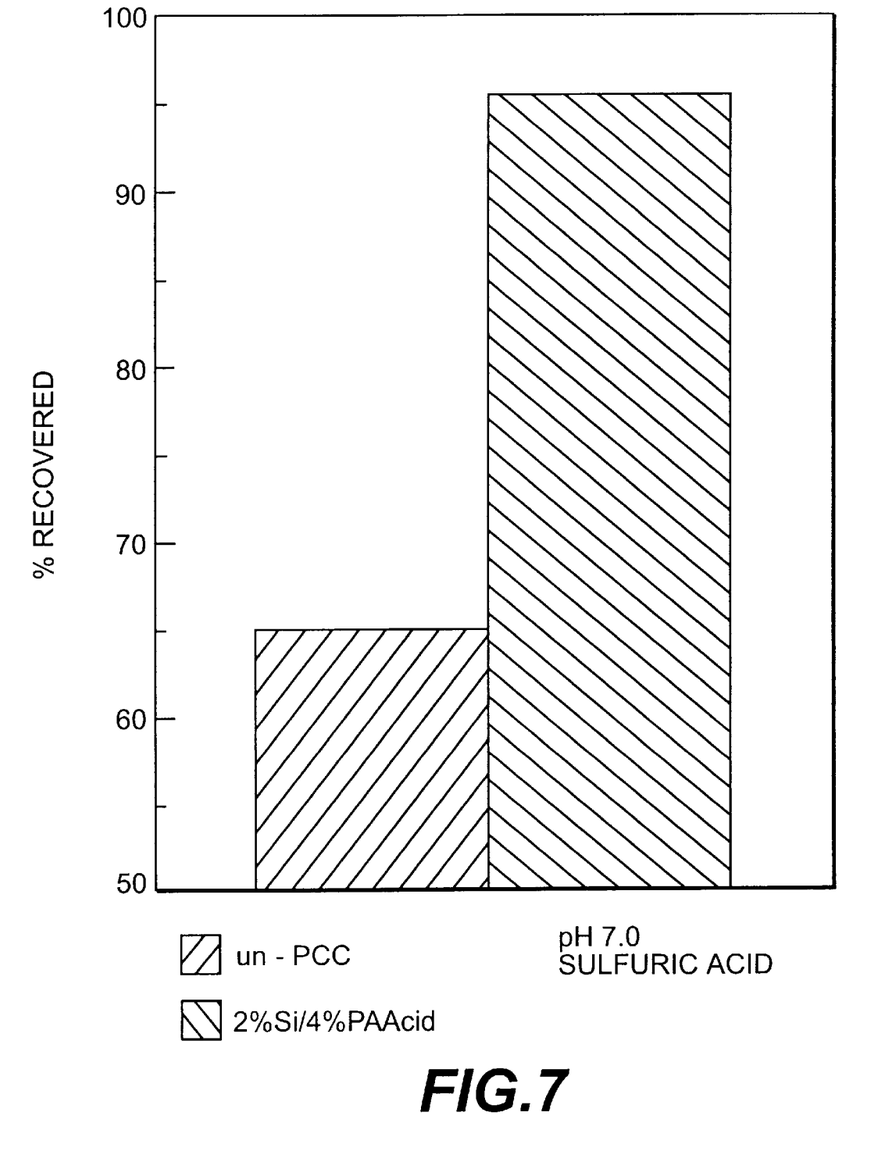
FIG. 7 shows a plot comparing the amount of ash recovered of a scalenohedral precipitated calcium carbonate composition of the present invention using 2% sodium silicate and 4% polyacrylic acid, to the amount of ash recovered of a composition not treated in accordance with the teachings of the present invention.

In a second part of the experiment of the present invention, the inventors were able to determine that a treated calcium carbonate slurry according to the teachings of the present invention does, in fact, resist decomposition at pH 7.0. This was proven by showing the residual calcium carbonate after a set time, the results of which are shown in FIG. 7, which will be discussed hereinbelow in the following example.

EXAMPLE 7

Treated Scalenohedral Precipitated Calcium Carbonate

A 19.5% solids slurry of scalenohedral precipitated calcium carbonate was treated with 2% sodium silicate based on the dry weight of calcium carbonate. This mixture was mixed for 5 minutes. After mixing, 4% polyacrylic acid, based on the dry weight of calcium carbonate, was added to this blend. This resultant slurry was mixed at 300 RPM for another 5 minutes.

The pH of 500 ml of deionized water was adjusted to 6.0 with 1% sulfuric acid and/or 25% caustic solution. To this 500 ml of deionized water, 2 ml of scalenohedral precipitated calcium carbonate slurry which was treated in accordance with the preceding paragraph was added. The pH of this resultant slurry was kept constant at 7.0 for three minutes by adding 1% sulfuric acid solution. This sulfuric acid solution was filtered out of the slurry through an ashless filter paper. The residue slurry was heated at 500° C. for 1 hour in a crucible which was weighed prior to the slurry being added therein. The amount of ash recovered for the treated slurry is shown in FIG. 7 as being 95%, which shows that the treated PCC did not decompose since if it had, this percentage value would have been lower than 95%.

These results can be compared to a second example slurry which was not treated with sodium silicate, but which was prepared with the same parameters as the treated precipitated calcium carbonate hereinabove. The amount of ash for this untreated slurry was only 65%, proving that the uncoated or untreated calcium carbonate decomposes at a pH of 7.0, whereas the coated or treated calcium carbonate only slightly decomposes at a pH of 7.0, thereby showing that the treated PCC survives at a pH of 7.0.

In a third part of the experiment involving the present invention, brightness pads with wood containing furnishes and calcium carbonate fillers treated in accordance with the teachings of the present invention were formed.

EXAMPLE 8

Scalenohedral Precipitated Calcium Carbonate

A 19.5% (active with 80.5% water) solids slurry of scalenohedral precipitated calcium carbonate was treated with 2% sodium silicate, based on the dry weight of calcium carbonate. This resultant slurry was mixed for 5 minutes at 300 RPM. After mixing, 4% formic acid, based on the dry weight of calcium carbonate was added to the slurry, and the resultant slurry was mixed for another 5 minutes.

Forming Of Brightness Pads

The pH of a pulp slurry was adjusted to 6.0 or 7.0 with 1% sulfuric acid solution on a 25% caustic solution. The pulp slurry contained groundwood stock obtained from Crown Vatague Company, St. Francisville, La. The calcium carbonate treated as put forth in the previous paragraph and untreated calcium carbonate were added to the pulp in different additions of 0.2, 0.4, 1.0 and 2.0 ml each. The pH of this resultant mixture for the different pulp samples containing treated and untreated calcium carbonate was kept constant at 6.0 or 7.0 for 30 minutes. Afterwards, pulp pads were made by filtering this resultant mixture through a Buchner filter equipped with a WHATMAN® 41 filter paper. The pads were pressed twice in order to squeeze out as much water as possible, and dried in a drier drum. The brightness of each of the pads for both the treated and untreated calcium carbonate was measured with a BRIGHTIMETER™ Micro 5-5 device manufactured by Technidyne.

Figure 8:
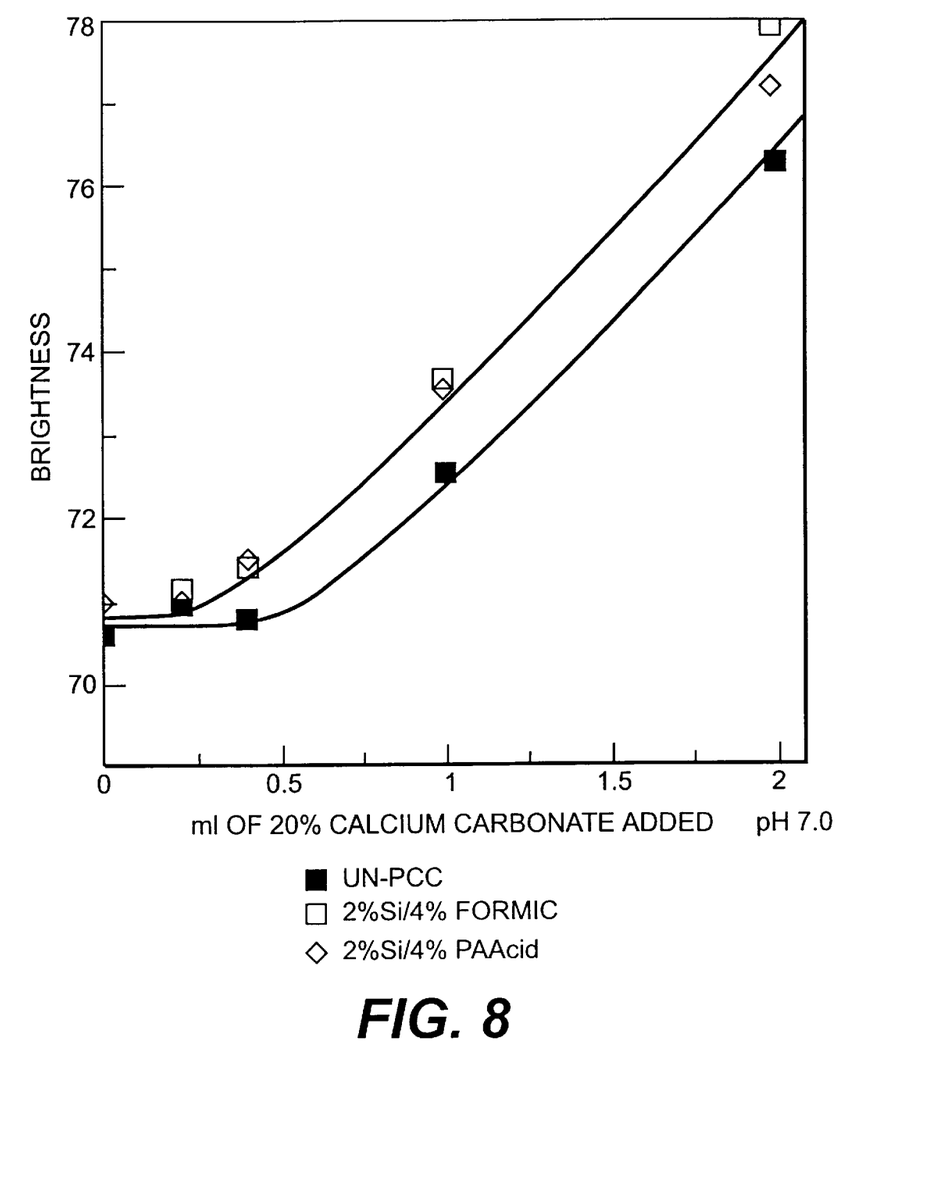
FIG. 8 is a graph showing brightness vs. the addition of a calcium carbonate slurry composition of the present invention containing 2% sodium silicate and 4% formic acid, and 2% sodium silicate and 4% polyacrylic acid when added to a groundwood pulp slurry to that of an untreated precipitated calcium carbonate slurry in a groundwood pulp slurry.

FIG. 8 shows a graph of the brightness vs. the addition rate for both the treated calcium carbonate and untreated calcium carbonate. As is shown in FIG. 8, the pads which had calcium carbonate treated with 2% sodium silicate/4% formic acid, based on the dry weight of calcium carbonate were brighter than those pads which contained an untreated calcium carbonate slurry.

EXAMPLE 9

Scalenohedral Precipitated Calcium Carbonate

A 19.5% (active with 80.5% water)solids slurry of scalenohedral precipitated calcium carbonate was treated with 2% sodium silicate, based on the dry weight of calcium carbonate, and 4% polyacrylic acid, based on the dry weight of calcium carbonate. Four pads were made by the process described in Example 8 for forming brightness pads.

The brightness of these pads which were treated according to the preceding paragraph is also shown in FIG. 8, where, again, these pads containing the treated calcium carbonate were brighter than those pads containing the untreated calcium carbonate.

EXAMPLE 10

Figure 9:
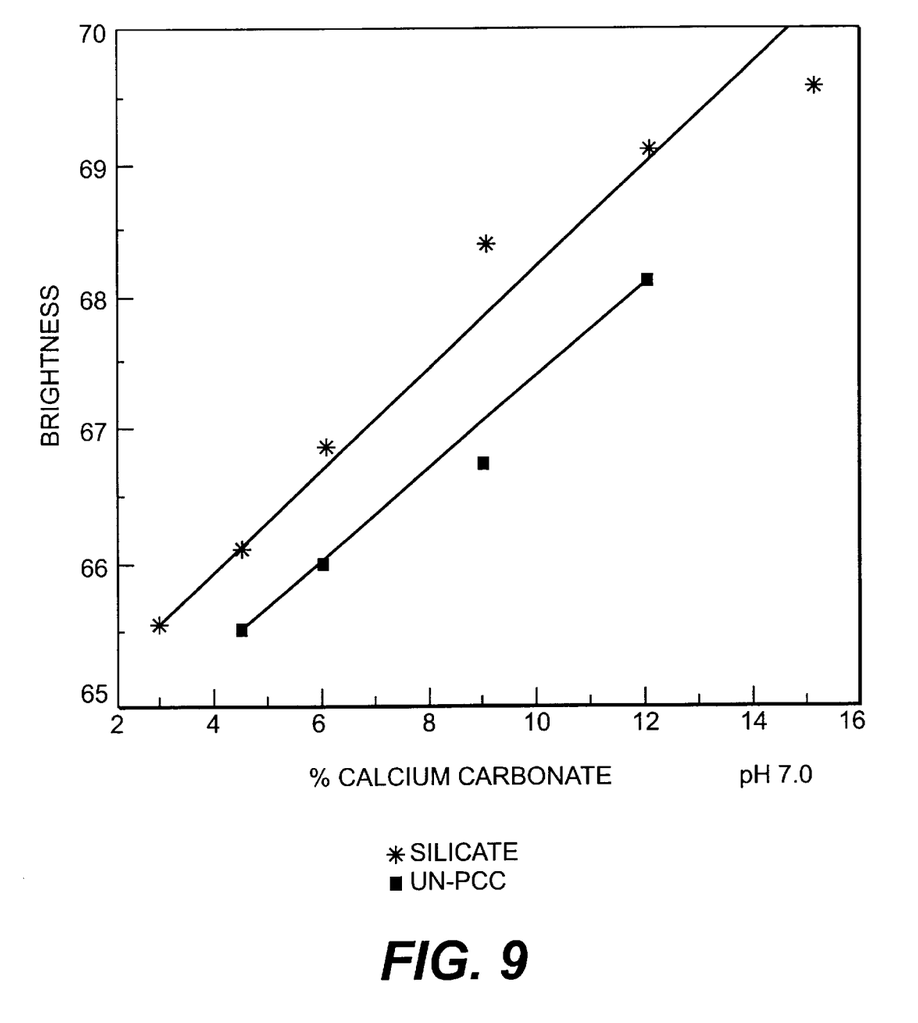
FIG. 9 is a graph showing brightness vs. varying percentages of a scalenohedral precipitated calcium carbonate composition of the present invention containing 1% sodium silicate and 4% phosphoric acid when added to a groundwood pulp slurry to that of an untreated precipitated calcium carbonate slurry in a groundwood pulp slurry.

A 19.5% solids slurry of scalenohedral precipitated calcium carbonate was treated with 1% sodium silicate, based on the dry weight of calcium carbonate and 4% phosphoric acid, based on the dry weight of calcium carbonate. Four pads were made by the process described in Example 8 for forming the brightness pads, except that 1% phosphoric acid solution was used instead of the sulfuric acid to keep the pH constant at 7.0 during the pad making process. The results of these pads are shown in FIG. 9, where the brightness vs. the addition rate is shown for the several pads containing the untreated calcium carbonate and those pads containing the untreated calcium carbonate. From this graph of FIG. 9, it is apparent that the pads containing the treated calcium carbonate were brighter than those pads containing the untreated calcium carbonate.

EXAMPLE 11

Pilot Paper Machine Trial

Paper was made on a laboratory scale custom papermaking machine which is manufactured by Eastern Machine Builders Company. This machine includes a clear plastic headbox; a foundrinier; a press section; a Yankee dryer; and two dryer sections. The stock consisted of a 100% high consistency groundwood obtained from Champion Paper Company, Deferiet, N.Y. The pH of the stock was maintained at 6.0 to 7.0 at the headbox by adding a solution of 10% phosphoric acid or of 10% NaOH to the solution via the inlet to the fan pump located near the headbox. A precipitated calcium carbonate slurry was mixed and added to the thin stock just before the stock enters the headbox.

Samples 0 through 25% solids slurries of precipitated calcium carbonate were left untreated and added to the stock as set forth in the preceding paragraph, while several samples of 0 through 25% solids slurries of precipitated calcium carbonate were treated with 1% sodium silicate based on the dry weight of calcium carbonate, and 4% phosphoric acid based on the dry weight of calcium carbonate.

Figure 10:
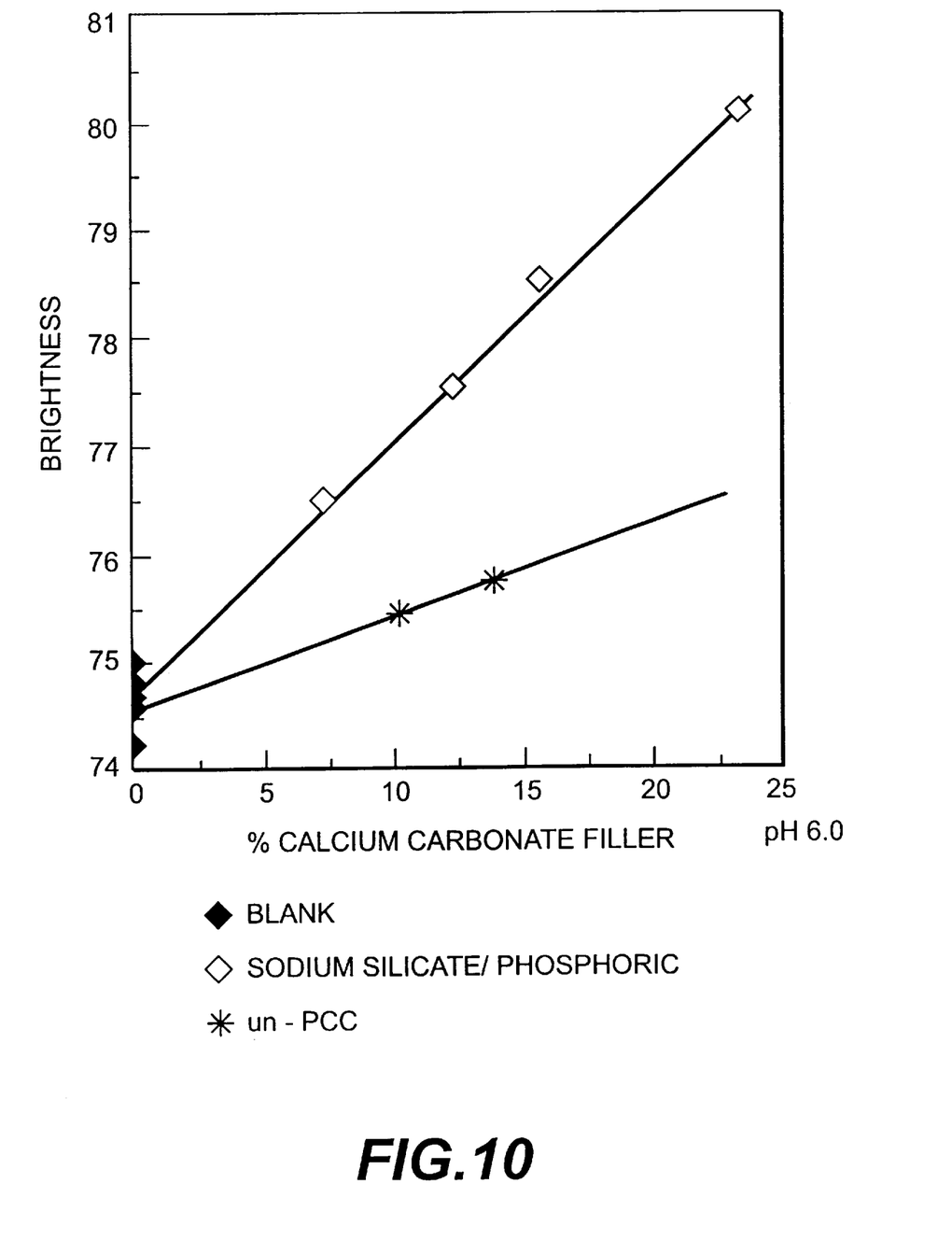
FIG. 10 is a graph showing brightness vs. varying percentages of a precipitated calcium carbonate composition for several paper samples wherein one sample contains a filler of precipitated calcium carbonate treated with 1% sodium silicate and 4% phosphoric acid, another paper sample contains a filler of untreated precipitated calcium carbonate, and a third paper sample contains no filler of precipitated calcium carbonate.

The brightness results for the several types of paper are shown in FIG. 10. The paper which was not coated with a calcium carbonate filler is represented as a solid triangle in FIG. 10. The paper coated with the calcium carbonate which was untreated is represented by an asterisk. The paper coated with the calcium carbonate which was treated in accordance with the teachings of the present invention is represented by an open triangle. As shown in FIG. 10, the brightness values for the paper containing the treated calcium carbonate are higher than the paper containing the untreated calcium carbonate or no calcium carbonate filler.

Examples 8, 9, 10 and 11 are represented herein to prove that calcium carbonates treated in accordance with the teachings of the present invention can be used at lower pH values in conjunction with fiber stock which is mechanically produced, thereby demonstrating the feasibility of using these calcium carbonates as fillers in wood containing papermaking systems.

While the present invention has been particularly set forth in terms of specific embodiments thereof, it will be understood in view of the instant disclosure, that numerous variations upon the invention are now enabled to those skilled in the art, which variations yet reside within the scope of the present invention. Accordingly, the invention is to be broadly construed, and limited only by the scope and spirit of the claims now appended hereto.

What is claimed is:

1. A calcium carbonate composition for use in an acid paper making process, comprising:
   a) calcium carbonate;
   b) at least about 0.1%, based on the dry weight of said calcium carbonate, of sodium silicate; and
   c) at least about 0.1%, based on the dry weight of said calcium carbonate, of alum, said elements b) and c) acting to resist decomposition of said calcium carbonate caused by acids in said paper making process.

2. The calcium carbonate composition of claim 1 wherein said alum is present in an amount of from about 0.1% to about 25%, based on the dry weight of calcium carbonate.

3. A process for the preparation of an acid-resistant calcium carbonate for use in an acid paper making process which comprises:
   a) adding to a calcium carbonate composition at least about 0.1%, based on the dry weight of the calcium carbonate, of sodium silicate;
   b) adding to said calcium carbonate at least about 0.1%, based on the dry weight of the calcium carbonate, of alum, said elements in steps a) and b) acting to resist decomposition of said calcium carbonate caused by acids in said paper making process.

4. The method of improving optical properties of neutral to weakly acidic paper comprising adding an effective amount of the composition of claim 1 to a paper making process.

5. A calcium carbonate composition of claim 1 wherein the amount of said sodium silicate ranges between 0.1% to 5%, based on the dry weight of said calcium carbonate.

6. A process of claim 3 comprising adding said sodium silicate in an amount ranging from 0.1% to 5%, based on the dry weight of said calcium carbonate.

* * * * *